United States Patent [19]
Marchisio et al.

[11] Patent Number: 6,086,104
[45] Date of Patent: Jul. 11, 2000

[54] WHEEL-ARCH COVER PANEL FOR A MOTOR VEHICLE

[75] Inventors: Enzo Marchisio, Pinerolo; Maurizio Tasca, Turin, both of Italy

[73] Assignee: San Valeriano S.p.A., Turin, Italy

[21] Appl. No.: 09/044,406

[22] Filed: Mar. 19, 1998

[51] Int. Cl.$^7$ .................................................. B62B 9/16
[52] U.S. Cl. ............................................. 280/851; 428/95
[58] Field of Search .................. 280/847, 152.1, 280/152.2, 152.3, 848, 849, 851; 428/85, 95, 97

[56] References Cited

U.S. PATENT DOCUMENTS

| | | | |
|---|---|---|---|
| 4,361,606 | 11/1982 | Butler et al. | 280/851 X |
| 4,555,380 | 11/1985 | Munakata et al. | 264/510 |
| 4,598,000 | 7/1986 | Mantarro | 280/851 X |
| 4,722,541 | 2/1988 | Gray et al. | 280/851 |
| 4,735,427 | 4/1988 | Fuchs | 280/152 |
| 4,966,799 | 10/1990 | Lucca et al. | 428/95 |
| 5,153,388 | 10/1992 | Wittenmayer et al. | 181/290 |
| 5,582,430 | 12/1996 | Bauer et al. | 280/851 |
| 5,839,761 | 11/1998 | Dodt | 280/851 |

FOREIGN PATENT DOCUMENTS

| | | |
|---|---|---|
| 0 222 193 | 5/1987 | European Pat. Off. . |
| 0 262 092 | 3/1988 | European Pat. Off. . |
| 295 08 736 U | 11/1985 | Germany . |
| 4240935 | 6/1994 | Germany . |
| 295 17 047 U | 2/1996 | Germany . |
| WO 94/19228 | 9/1994 | WIPO . |

OTHER PUBLICATIONS

Patent Abstracts of Japan, vol. 013, No. 432, Sep. 27, 1989 and JP 01 165424 Jun. 29, 1989 in the name of Nishikawa Kasei KK.

*Primary Examiner*—Michael Mar
*Attorney, Agent, or Firm*—Seidel, Gonda, Lavorgna & Monaco, PC

[57] ABSTRACT

A wheel-arch cover panel for a motor vehicle is formed by a thermoformed, laminar structure, and comprises a layer of plastics material impermeable to liquids, at least one layer of fabric, particularly a non-woven fabric, which is applied to the face of the layer of plastics material facing towards the wheel of the motor vehicle and at least a third layer of expanded plastics material on the face facing towards the bodywork.

6 Claims, 1 Drawing Sheet

WHEEL-ARCH COVER PANEL FOR A MOTOR VEHICLE

The present invention relates to a wheel-arch cover panel for fitting on the external bodywork of a motor vehicle.

According to the prior art, these panels are made of a plastics material formed by injection moulding and have fixing means for fixing them to the bodywork of the motor vehicle. More recently, panels formed of a non-woven fabric impregnated with resin on the side facing the bodywork of the motor vehicle have been introduced.

As a result of studies directed towards reducing the noisiness of the vehicle, it has been found that wheel-arch cover panels help considerably in the reduction of the noise level reached by the motor vehicle in motion. In this connection, panels formed of an impregnated, non-woven fabric reduce the noise level, but these panels are subject to rapid wear and do not achieve good water proofing.

To prevent the problems encountered in the prior art, the subject of the present invention is a wheel-arch cover panel for a motor vehicle, characterised in that it is formed by a thermoformed laminar structure comprising a layer of plastics material impermeable to liquids, and at least one layer of fabric, particularly non-woven fabric, which is applied to the face of the layer of plastics material facing towards the wheel of the motor vehicle and at least a third layer which is applied to the face of the sheet of impermeable plastics material facing towards the bodywork of the motor vehicle constituted by an expanded plastics material.

Further characteristics and advantages of the present invention will become clear from the following detailed description given with reference to the appended drawings, provided purely by way of non-limiting example, in which.

Figure 1:
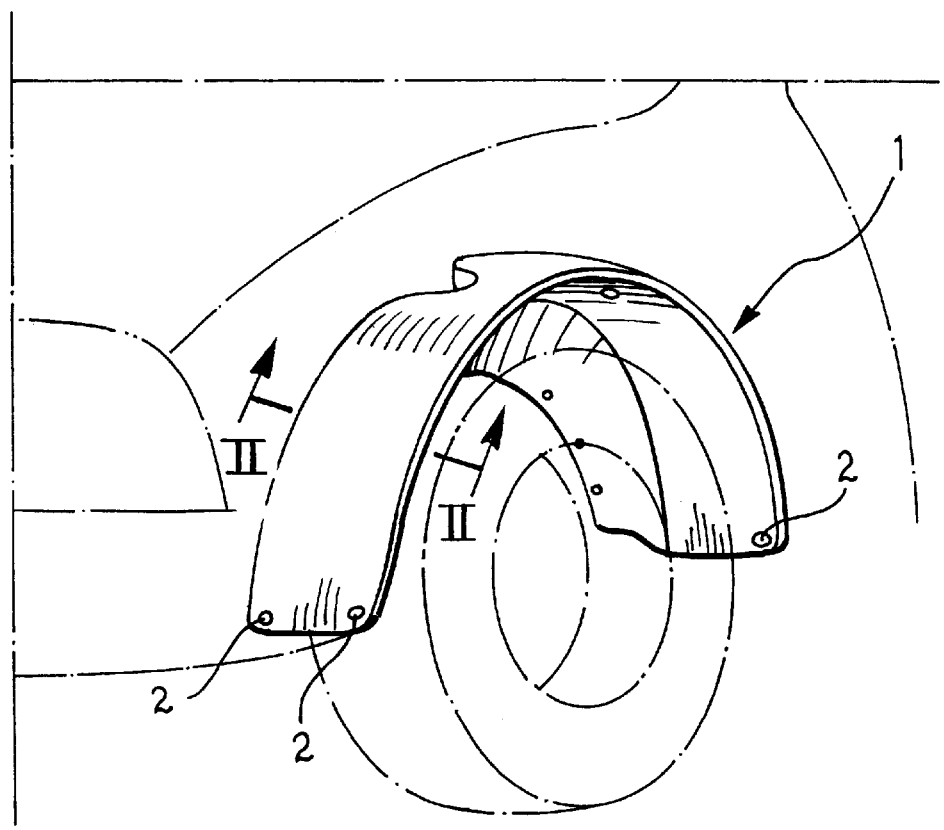
FIG. 1 is a perspective view of a wheel-arch cover panel.
Figure 2:
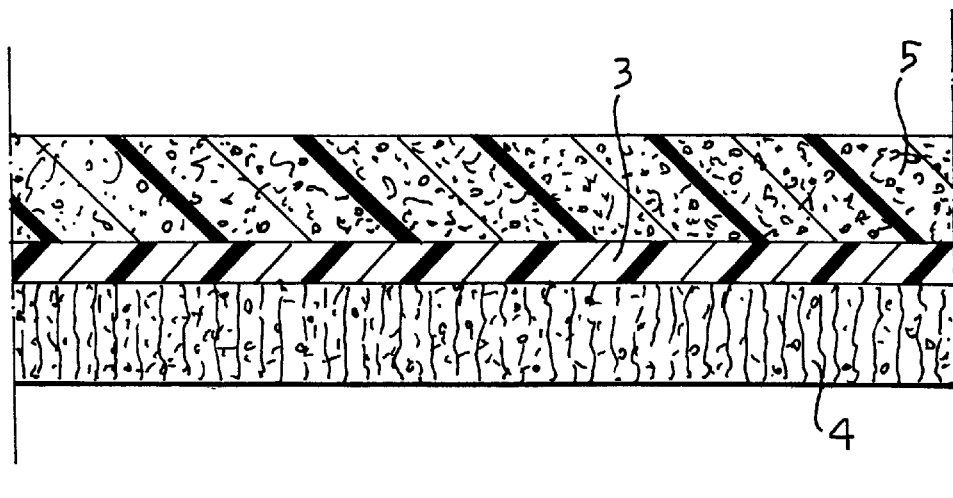
FIG. 2 is a section taken on the line II—II of FIG. 1.

With reference to the drawings, a wheel-arch cover panel, generally indicated 1, has fixing means which, in the embodiment in question, are through-holes 2, for its fixing to the bodywork of the motor vehicle.

According to the invention, the panel is formed by a laminar structure comprising a layer 3 of thermoformable, thermoplastic plastics material which can confer the necessary rigidity and impermeability to liquids on the structure. The layer 3 of plastics material is produced from, for example, a sheet of polyolefin plastics material, such as, for example, polyethylene, polypropylene, or acrylonitrile butadiene and styrene (ABS). Typically, the layer 3 has a thickness of from 0.5 to 3 mm.

A sheet 4 of fabric, particularly constituted by a needled non-woven fabric, is applied to the face of the layer 3 facing towards the wheel of the motor vehicle and, in the preferred embodiment, is a needled fabric with a three-dimensional structure having fibres arranged parallel to its general plane and fibres arranged perpendicular to the general plane; these non-woven fabrics are known and are produced according to techniques known by the names VELOUR and DILOUR (registered trade marks). The layer 4 preferably has a specific weight of from 0.05 to 0.1 g/cm$^3$ and a thickness of from 1 to 5 mm.

It has been found that non-woven fabrics having a three-dimensional structure of the type mentioned above have optimal sound-deadening properties for the specific application and substantially reduce the level of noise generated by the wheel-arch cover panel when the motor vehicle is in motion.

In the preferred embodiment, the wheel-arch cover panel is a three-layered structure comprising a further layer 5 which is applied to the face of the layer of impermeable plastics material facing towards the bodywork of the motor vehicle. The layer 5 is preferably a layer of expanded plastics material, such as, for example, open-cell flexible polyurethane with a thickness typically of from 3 to 10 mm, more preferably having a surface skin on its face facing the bodywork.

The non-woven fabric used for the layer 4 is typically formed from polyester, polypropylene, polyethylene, polyamide or, in any case, synthetic fibres resistant to water and abrasion.

The laminar structure with three or more layers can easily be produced by a coextrusion process simultaneously with the extrusion of the sheet of impermeable plastics material 3. The laminar structure thus produced is then subjected to a thermoforming process in order to be formed to the required shape for a wheel-arch cover panel.

The advantages of the panel of the invention lie mainly in the achievement of good sound-deadening and water-proofness characteristics as well as resistance to wear and abrasion when the motor vehicle is in motion.

According to a preferred embodiment, the layer 3 is a structural element having an alveolar or cellular structure.

Such a structural element may e.g., consist of an integral extrudate having an upper and lower wall connected one to the other by means of a plurality of septa which define, together with the upper and lower walls, a plurality of longitudinal substantially parallel passages.

The structural element may alternatively consist of a layered structure comprising an upper and a lower sheet member and an intermediate layer having a plurality of hollow projections, protruding from an interconnecting web, said intermediate layer being bonded to the upper and lower sheet members at the tops of the projections and in correspondence of the interconnecting web.

What is claimed is:

1. A wheel-arch cover panel for a motor-vehicle formed by an arch shaped thermoformed laminar structure comprising:
    a layer of plastic material impermeable to liquids;
    at least one layer of a needled non-woven fabric applied to a first face of the impermeable layer of plastic material facing towards a wheel-well of the motor vehicle, the needled non-woven fabric having a three-dimensional structure, the non-woven fabric having fibers arranged along the arch and extending normal to the arch; and
    at least one layer of an expanded sheet plastic material applied to a second face of the impermeable layer of plastic material, the at least one layer of expanded sheet plastic material having an exterior surface facing towards the motor vehicle body, and the at least one layer of expanded sheet plastic material being made of open-cell expanded polyurethane.

2. A wheel-arch cover panel according to claim 1, wherein the at least one layer of fabric is formed by fibers of material selected from the group of polyethylene, polyester, polypropylene and polyamides.

3. A wheel-arch cover panel according to claim 1, wherein the at least one layer of fabric has a specific weight of 0.05 to 0.1 g/cm$^3$ and a thickness of 1 to 5 mm.

4. A wheel-arch cover panel according to claim 1 formed by a coextruded laminar structure subjected to thermoforming.

5. A wheel-arch cover panel according to claim 1, wherein said impermeable layer of plastic material has an alveolar or cellular structure.

6. A wheel-arch cover panel according to claim 1, where the at least one layer of fabric is formed of synthetic fibers resistant to water and abrasion.

* * * * *